2,725,280

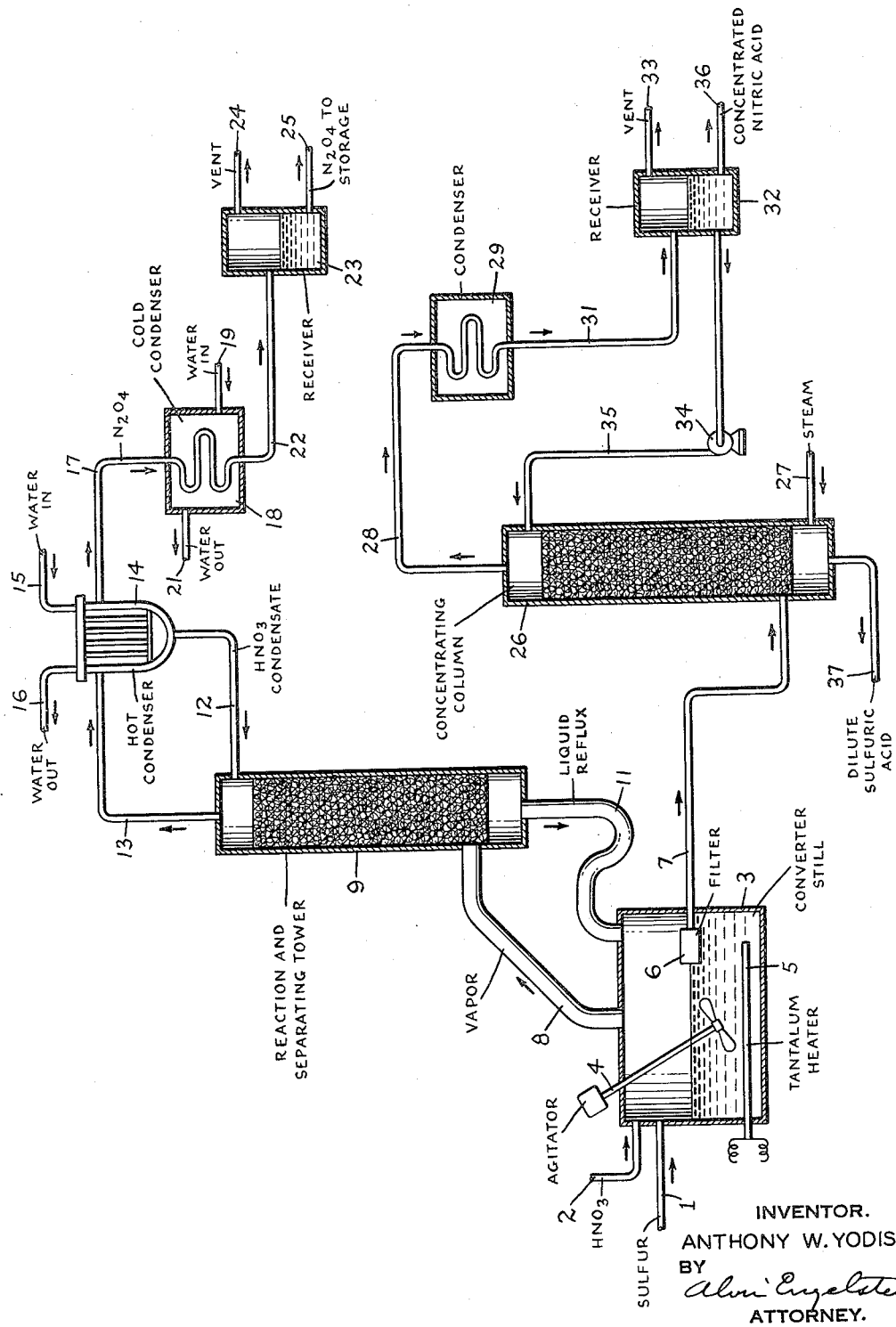

PROCESS FOR MANUFACTURE OF STRONG DINITROGEN TETROXIDE

Anthony W. Yodis, Claymont, Del., assignor to Allied Chemical & Dye Corporation, New York, N. Y., a corporation of New York Application February 11, 1953, Serial No. 336,369

6 Claims. (Cl. 23—157)

This invention relates to the production of dinitrogen tetroxide and more particularly refers to a new and improved process for converting sulfur and nitric acid into high yields of dinitrogen tetroxide.

Various methods have been proposed in recent years for the manufacture of $N_2O_4$. These methods depend on the use of heat to crack nitric acid in concentrations in excess of 95% nitric or the absorption of $NO_2$ from ammonia oxidation units in various desiccants and their subsequent liberation by heat and absorption. Cracking of nitric acid is not an economical method particularly due to the requirement for materials of construction which will withstand the high temperatures of reaction. Likewise the desiccant absorption method involves high fixed capital expenditure and operating cost.

Many years ago the suggestion was made to prepare $NO_2$ (alternatively referred to as $N_2O_4$) by reacting nitric acid with sulfur. In the conversion of nitric acid and sulfur for production of $N_2O_4$, low yields of the desired product are obtained due to the incomplete conversion of the reactants and concomitant production of substantial quantities of by-products which generally are nitrosyl sulfuric acid and its anhydride, NO, $N_2O_3$, and water. The dinitrogen tetroxide produced is usually of inferior quality, green in color and contaminated with by-products difficult to remove. Obviously, such process had no practical utility and was never installed commercially.

One object of the present invention is to provide an efficient continuous process for converting sulfur and nitric acid into dinitrogen tetroxide.

Another object of this invention is to provide a process for producing high yields of high quality dinitrogen tetroxide.

Further objects and advantages will be apparent from the following description and accompanying drawing.

In accordance with the present invention, dinitrogen tetroxide may be produced by reacting nitric acid, preferably in excess of 80% $HNO_3$ concentration and more desirably in excess of 95% $HNO_3$ concentration, and elemental sulfur in a first reaction zone preferably maintained at a temperature within the range of 100° C., desirably 110° C., to a temperature below the melting point of sulfur, thereby producing as primary reaction products dinitrogen tetroxide and sulfuric acid together with small amounts of nitrosyl sulfuric acid, its anhydride, NO and $N_2O_3$, releasing vapors from the first zone comprising primarily $N_2O_4$, $HNO_3$, $H_2O$ together with minor amounts of nitrosyl sulfuric acid anhydride and lower oxides of nitrogen such as NO and $N_2O_3$, passing said vapors upwardly through a second reacting and separating zone countercurrent to and in intimate contact with cooler concentrated nitric acid to condense substantially all the vapor constituents having a boiling point above 86° C. and simultaneously convert at least a part of the lower oxides of nitrogen and nitrosyl sulfuric acid anhydride to additional dinitrogen tetroxide, returning the liquid condensate from the second zone to the first zone, releasing a vapor mixture comprising substantially anhydrous $HNO_3$ and $N_2O_4$ from the second zone, cooling said vapor mixture to effect condensation and separation of substantially anhydrous $HNO_3$, returning said anhydrous $HNO_3$ condensate to the second zone for intimate contact with vapors entering the second zone from the first zone, and condensing and collecting the $N_2O_4$ vapors separated from the mixture of $HNO_3$ and $N_2O_4$ leaving the second zone.

While I do not wish to predicate my invention on any theory of the mechanism of the reaction, the following explanation may aid in a better understanding of the invention.

The reaction between nitric acid and sulfur is quite complex and not thoroughly understood. One of the primary reactions involved may be illustrated by the following equation:

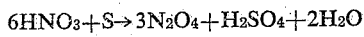
$$6HNO_3 + S \rightarrow 3N_2O_4 + H_2SO_4 + 2H_2O$$

Another strong competing reaction occurring simultaneously may be illustrated by the following equation:

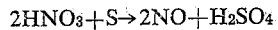
$$2HNO_3 + S \rightarrow 2NO + H_2SO_4$$

Other side reactions, the mechanism of which is not fully understood, involve the production of NO, $N_2O_3$, $N_2O_5$, $HNOSO_4$ and $(NO)_2S_2O_7$.

From the foregoing it will be evident that low yields and poor quality of the desired product dinitrogen tetroxide are produced by reaction of sulfur and nitric acid due in part to the formation of large quantities of by-products resulting from competing reactions. To illustrate more specifically, when nitric acid was added to sulfur, as suggested by the art, there was produced a vapor product composed of not more than about 75% $N_2O_4$, over 5% sulfur compounds, several percent lower oxides of nitrogen, down to 15% or more $HNO_3$ and water. The residual acid contained over 40% unreacted $HNO_3$, over 15% nitrosyl sulfuric acid, about 20% sulfuric acid and about 20% water and other by-products. Thus, the yield of dinitrogen tetroxide produced was less than 60% based on the feed nitric acid and the resulting dinitrogen tetroxide product was contaminated with a large amount of impurities which are most difficult to separate.

One of the by-products formed in large quantities, approximately 20%, during reaction of nitric acid and sulfur when carried out in a conventional manner is nitrosyl sulfuric acid. In the course of my investigation I noted that the nitrosyl sulfuric acid appeared in the $N_2O_4$ vapor product primarily in the form of nitrosyl sulfuric acid anhydride, i. e. nitrosyl sulfuric acid was substantially nonvolatile under the conditions of reaction and the anhydride was relatively quite volatile. I discovered that the maintenance of a copious amount of moisture in the reaction zone retarded the formation of nitrosyl sulfuric acid anhydride and also had the effect of substantially reducing the amount of nitrosyl sulfuric acid in the residual acid. I found favorable moisture conditions to minimize the formation of nitrosyl sulfuric acid and its anhydride could be attained by preventing discharge of water vapor from the system and retaining the water of reaction in the reaction zone. Retention of water in the reaction zone is accomplished by condensing water vapor leaving the reaction zone to prevent it from discharging from the system and returning such water condensate to the reaction zone thereby retaining a high moisture content at all times in contact with the reactants. Of course, water from an external source may be added to the reaction mixture but this procedure is not entirely satisfactory because the products are diluted and the capacity is reduced. I have further found that the quantities of other by-products, namely, the lower oxides of nitrogen and to some extent nitrosyl sulfuric acid may be converted to the desired dinitrogen tetroxide product by subjecting the vapor product resulting from the reaction of nitric acid and sulfur, in intimate contact with substantially anhydrous nitric acid in a second zone. Concomitantly, I effect condensation of the high boiling contaminants in the second zone.

The accompanying drawing is a diagrammatic flow sheet illustrating the process of the present invention.

The charging materials consisting of elemental sulfur in finely divided form and nitric acid are introduced through lines 1 and 2 respectively into converter still 3 which may be an empty enclosed chamber constructed of an acid resistant metal such as duriron. Converter still 3 is desirably equipped with a stirrer 4 to maintain the contents in constant agitation. Although the reaction is exothermic, under the conditions of operation a small amount of additional heat may be required which can be provided by conventional tantalum heater 5. A convenient method of initiating the reaction is to retain residual acid from a previous run in converter still 3, heat the mixture to the desired reaction temperature and then continuously feed nitric acid and sulfur through lines 1 and 2 to the heel of residual acid in still 3. Another method of initiating the reaction would be to dispose in converter still 3 a mixture of elemental sulfur and sulfuric acid of about 75% concentration and to this mixture add nitric acid to start the reaction and thereafter feed nitric acid and sulfur through lines 1 and 2. The reaction mixture in still 3 is maintained at a temperature within the range of about 100° C. to a temperature just below the melting point of sulfur. Sulfur has a melting point of about 115° C., the melting point varying a few degrees in either direction of 115° C. depending upon the form of sulfur, i. e. whether the sulfur is in a rhombic, monoclinic or amorphous form or a mixture thereof. Although the operation may be carried out at temperatures up to 135°–140° C., at temperatures substantially in excess of the melting point of sulfur there is a tendency for dinitrogen tetroxide to decompose; more important, if the sulfur is in molten condition in the reaction mixture it would make continuous operation difficult in that the molten sulfur would block or leak through the pores of filter 6 disposed near the top of the reaction mixture for the purpose of separating residual acid withdrawn through line 7. Also, when the sulfur is in the molten condition the rate of reaction is considerably reduced due to the smaller area of sulfur surface in contact with the reacting acid. Filter 6 may be any suitable filter for separating liquid from solid and for example may be constructed of porous fused alumina. At temperatures below 100° C. the reaction requires an unduly long time. The preferred temperature range for carrying out the reaction is just a few degrees below the melting point of sulfur, or stated another way, from about 110° C. to near the melting point of sulfur. The operation may conveniently be carried out at atmospheric pressures; superatmospheric or subatmospheric pressures are unnecessary.

The relative proportion of sulfur and nitric acid fed into converter still 3 is not critical provided there is always a sufficient excess of elemental sulfur for reaction with nitric acid in converter still 3. In general the operation may be carried out conveniently by introducing sulfur and $HNO_3$ in the proportion of 1 to 12.6 parts by weight. Of greater significance to the operation, is the concentration of nitric acid introduced as feed. Although the operation will work well with a nitric acid concentration feed in excess of 80%, preferably the nitric acid feed should be in excess of 95%. The reason for this is that with the lower concentrations of nitric acid feed there is produced a more dilute residual acid, i. e. a residual acid containing more water making more difficult and expensive the recovery of nitric acid and sulfuric acid therefrom.

The process of the present invention is particularly adapted for continuous operation in which procedure elemental sulfur and $HNO_3$ are continuously fed into converter still 3, vapor product continuously released from the top of still 3 through vapor line 8 and residual acid continuously withdrawn through line 7 in an amount sufficient to maintain a liquid level in still 3. Although not a preferred method of operation, the process may be carried out in semi-continuous manner with continuous feed of sulfur through line 1 and $HNO_3$ through line 2, and discharge of vapors through line 8 but without any withdrawal of residual acid through line 7 during the operation. After the liquid content in still 3 has built up to too high a level so as not to provide adequate vapor space for the release of vapors, the run is terminated and the still contents in whole or part discharged and a new run started. During the operation, whether continuous or semi-continuous, intimate contact of the reactants in the form of a slurry of sulfur in residual acid is assured by constant agitation with stirrer 4. The vapor released from the top of converter still 3 through vapor line 8 is a mixture containing predominantly $N_2O_4$ and $HNO_3$ together with appreciable amounts of $H_2O$, and smaller amounts of nitrosyl sulfuric acid anhydride and lower oxides of nitrogen. The vapors are introduced into reaction and separating tower 9 at a point near the bottom thereof, which tower is constructed of corrosive-resistant materials, for example, the shell of the tower may be made of duriron and the tower packed with sections of ceramic packing of an acid-resistant type. Vapor line 8 and liquid reflux return line 11 should also be constructed of a non-corrosive material such as duriron. The vapors entering through line 8 pass upwardly through the packing in tower 9 countercurrent and in intimate contact with liquid, substantially anhydrous $HNO_3$, entering the top of tower 9 through line 12. The anhydrous $HNO_3$ reacts with at least part of the lower oxides of nitrogen and nitrosyl sulfuric acid anhydride converting these impurities to additional dinitrogen tetroxide. The amount and temperature of the $HNO_3$ entering through line 12 should be sufficient to condense substantially all constituents of the vapor having a boiling point higher than the $HNO_3$. This may be readily determined by the conventional method of analyzing a sample of the vapors released from the top of tower 9 through line 13. Ordinarily a top tower temperature of 86° C. when operating at about atmospheric pressure will control the vapor composition through line 13 to permit the escape of a vapor mixture consisting of $N_2O_4$ and $HNO_3$ with a minor amount of other constituents. Reflux condensate composed primarily of $H_2O$ and $HNO_3$, and smaller amount of nitrosyl sulfuric acid, $H_2SO_4$ and lower oxides of nitrogen flows by gravity down through reflux line 11 into converter still 3. The apparatus in the drawing shows converter still 3 and tower 9 connected by individual vapor line 8 and reflux line 11. For smaller installations, it may be more economical to construct the apparatus with tower 9 directly superimposed on an opening into the top of converter still 3. In such construction liquid reflux condensate from the bottom of the tower will fall down directly into converter still 3 and vapor from still 3 would rise directly into the bottom of tower 9.

The $N_2O_4$ and $HNO_3$ vapor from line 13 enters hot condenser 14 maintained at a temperature slightly above the boiling point (22° C.) of $N_2O_4$, i. e. a temperature of about 24° C. to effect condensation of the $HNO_3$ which is returned via line 12 to the top of tower 9. Control of the temperature of hot condenser 14 is obtained by indirect contact with cooling water entering and leaving through lines 15 and 16 respectively.

Uncondensed vapors containing over 95% $N_2O_4$ pass from hot condenser 14 through line 17 into cold condenser 18 where it is cooled by water entering and leaving through lines 19 and 21 to a temperature of about 10° C. to condense $N_2O_4$, and the liquid $N_2O_4$ then passes through line 22 and collects in receiver 23. Uncondensed gases are released from the top of receiver 23 through line 24. The liquid condensate product, directed to storage through line 25, contains over 95%, generally 96% to 97%, $N_2O_4$, about 2% or less $HNO_3$ about 1% or less $H_2O$ and, very important, less than about 0.2% of the undesirable sulfur compounds and less than about 0.2% of the undesirable lower oxides of nitrogen. Sulfur compounds and lower oxides of nitrogen in amounts of 1 or more percent are a detriment to the use of dinitrogen tetroxide in rocket fuels and in certain chemical reactions. Substantial amounts of $HNO_3$ could be tolerated in $N_2O_4$ and in fact mixtures of $HNO_3$ and $N_2O_4$ are frequently employed in chemical reactions.

Residual acid discharging from still 3 through line 7, when run in a continuous manner, contains about 53% $H_2SO_4$, about 14% $HNO_3$, about 6% $HNOSO_4$, about 25% $H_2O$ and about 2% other by-products. The composition of residual acid is significant with respect to the low percentage of $HNO_3$ and the high percentage of $H_2SO_4$. The small amount of $HNO_3$ in the residual acid indicates high conversion of $HNO_3$ fed into the system. As a matter of fact, the yield of dinitrogen tetroxide obtained by my process based on the amount of $HNO_3$ charged is in excess of 75%, and in some of my operations I have obtained a yield of over 90%. The high concentration of $H_2SO_4$ in the residual acid lends itself to the separation of $HNO_3$ and a fairly concentrated $H_2SO_4$ as will now be described.

Residual acid is introduced through line 7 into the bottom of a packed acid-resistant column 26. Steam entering through line 27 is passed upwardly through the column thereby stripping $HNO_3$ from the residual acid entering through line 7. Concentrated $HNO_3$ is released from the top of column 26 through line 28, condensed in condenser 29 and then directed through line 31 to receiver 32. Uncondensed gases are vented through line 33 at the top of receiver 32. A portion of the concentrated nitric acid condensate is withdrawn from receiver 32 and forced by pump 34 through line 35 into the top of column 26 to control the temperature at the top of column 26 to permit the release of concentrated nitric acid vapor through line 28. Concentrated nitric acid generally in excess of 95% $HNO_3$ is discharged through line 36 and may be sent to storage or recycled to converter still 3 for further reaction with elemental sulfur. Dilute sulfuric acid, generally about 66% $H_2SO_4$ collecting in the bottom of column 26, is discharged through line 37 and if desired may be further concentrated in a conventional manner to strong sulfuric acid. Although small in amount, I have found that the nitrosyl sulfuric acid contained in the residual acid is decomposed into sulfuric acid and nitric acid in column 26.

From the foregoing it will be apparent that my two-zone conversion method under the conditions set forth, accomplishes highly efficient conversion of sulfur and nitric acid into dinitrogen tetroxide with a minor amount of undesirable compounds.

The following example illustrates the present invention.

A vessel equipped with a heating element and agitator and initially charged with a heel of residual acid from a previous run is heated to a temperature of 112° C. and maintained at that temperature by means of the heating element. Into the vessel are fed elemental sulfur and 97.2% $HNO_3$ at the rate of 19.23 pounds and 248.6 pounds per hour respectively. Vapors from the vessel are fed to the bottom of a vertical packed tower wherein they pass upwardly in intimate contact with down-flowing substantially anhydrous $HNO_3$. Reflux condensate collecting in the bottom of the tower is returned to the vessel. Vapors from the top of the tower are cooled to a temperature of 25° C. by indirect heat exchange with warm water in a hot condenser thereby condensing $HNO_3$ which is returned to the top of the tower for further contact with vapors entering the tower from the reaction vessel. The uncondensed vapors are cooled to a temperature of 10° C. and the condensate collected as a product of the process. This product is produced at the rate of 164.5 pounds per hour and contains 96.5% $N_2O_4$, 2.2% $HNO_3$, about 1% $H_2O$, less than 0.15% sulfur compounds, and less than 0.15% lower oxides of nitrogen. Residual acid is withdrawn from the reaction vessel at the rate of 101.17 pounds per hour and has the following composition: 53.19% $H_2SO_4$, 14.12% $HNO_3$, 6.1% $HNOSO_4$, and 26.59% $H_2O$. The yield of dinitrogen tetroxide based on the nitric acid charged is 90%.

Although certain preferred embodiments of the invention have been disclosed for purpose of illustration it will be evident that various changes and modifications may be made therein without departing from the scope and spirit of the invention.

I claim:

1. A process for the manufacture of dinitrogen tetroxide which comprises reacting elemental sulfur and nitric acid thereby producing as primary reaction products dinitrogen tetroxide and sulfuric acid together with nitrosyl sulfuric acid, nitrosyl sulfuric acid anhydride, lower oxides of nitrogen and $H_2O$ as by products, releasing vapors evolved from said reaction comprising primarily $N_2O_4$, $HNO_3$, $H_2O$, and small amounts of nitrosyl sulfuric anhydride and lower oxides of nitrogen, cooling said vapors to effect condensation of the $H_2O$, and returning said condensate to the mixture of elemental sulfur and nitric acid undergoing reaction.

2. A process for the manufacture of dinitrogen tetroxide which comprises reacting nitric acid and elemental sulfur in a first reaction zone thereby producing as primary reaction products dinitrogen tetroxide and sulfuric acid together with nitrosyl sulfuric acid, its anhydride, lower oxides of nitrogen and water as by-products, releasing vapors from the first reaction zone comprising primarily $N_2O_4$, $HNO_3$, $H_2O$, and small amounts of nitrosyl sulfuric acid anhydride and lower oxides of nitrogen, passing said vapors upwardly through a second reacting and separating zone countercurrent to and in intimate contact with cooler concentrated nitric acid to condense substantially all the vapor constituents having a boiling point above 86° C. and simultaneously converting at least part of the lower oxides of nitrogen and nitrosyl sulfuric acid anhydride to dinitrogen tetroxide, and returning the liquid condensate from the second zone to the first zone.

3. A process for the manufacture of dinitrogen tetroxide which comprises reacting nitric acid and elemental sulfur in a first reaction zone thereby producing as primary reaction products dinitrogen tetroxide and sulfuric acid together with nitrosyl sulfuric acid, its anhydride, lower oxides of nitrogen, and water as by-products, releasing vapors from the first reaction zone comprising primarily $N_2O_4$, $HNO_3$, $H_2O$, and small amounts of nitrosyl sulfuric acid anhydride and lower oxides of nitrogen, passing said vapors upwardly through a second reaction and separating zone countercurrent to and in intimate contact with cooler concentrated nitric acid to condense substantially all the vapor constituents having a boiling point above 86° C. and simultaneously converting at least a part of the lower oxides of nitrogen and nitrosyl sulfuric acid anhydride to dinitrogen tetroxide, returning liquid condensate from the second zone to the first zone, releasing a vapor mixture comprising substantially anhydrous $HNO_3$ and $N_2O_4$ from the second zone, cooling said vapor mixture to effect condensation and separation of substantially anhydrous $HNO_3$, returning said anhydrous $HNO_3$ condensate to the second zone for intimate contact with vapors entering the second zone from the first zone and condensing and collecting the $N_2O_4$ vapors separated from the mixture of $HNO_3$ and $N_2O_4$ leaving the second zone.

4. A process for the manufacture of dinitrogen tetroxide which comprises reacting nitric acid having a concentration in excess of 80% $HNO_3$ and elemental sulfur in a first reaction zone maintained at a temperature between 100° C. to a temperature below the melting point of sulfur, thereby producing as primary reaction products dinitrogen tetroxide and sulfuric acid together with nitrosyl sulfuric acid, its anhydride, lower oxides of nitrogen, and water as by-products, releasing vapors from the first reaction zone comprising primarily $N_2O_4$, $HNO_3$, $H_2O$, and small amounts of nitrosyl sulfuric acid anhydride and lower oxides of nitrogen, passing said vapors upwardly through a second reacting and separating zone countercurrent to and in intimate contact with cooler concentrated nitric acid to condense substantially all the vapor constituents having a boiling point above 86° C. and simultaneously converting at least a part of the lower oxides of nitrogen and nitrosyl sulfuric acid anhydride to dinitrogen tetroxide, returning liquid condensate from the second zone to the first zone, releasing a vapor mixture comprising substantially anhydrous $HNO_3$ and $N_2O_4$ from the second zone, cooling said vapor mixture to effect condensation and separation of substantially anhydrous $HNO_3$, returning said anhydrous $HNO_3$ condensate to the second zone for intimate contact with vapors entering the second zone from the first zone and condensing and collecting $N_2O_4$ vapors separated from the mixture of $HNO_3$ and $N_2O_4$ leaving the second zone.

5. A process for the manufacture of dinitrogen tetroxide which comprises reacting nitric acid having a concentration in excess of 95% $HNO_3$ and elemental sulfur in a first reaction zone maintained at a temperature between 110° C. to a temperature below the melting point of sulfur thereby producing as primary reaction products dinitrogen tetroxide and sulfuric acid together with nitrosyl sulfuric acid, its anhydride, lower oxides of nitrogen, and water as by-products, releasing vapors from the first reaction zone, comprising primarily $N_2O_4$, $HNO_3$, $H_2O$, and small amounts of nitrosyl sulfuric acid anhydride and lower oxides of nitrogen, passing said vapors upwardly through a second reacting and separating zone countercurrent to and in intimate contact with cooler concentrated nitric acid to condense substantially all the vapor constituents having a boiling point above 86° C. and simultaneously converting at least a part of the lower oxides of nitrogen and nitrosyl sulfuric acid anhydride to dinitrogen tetroxide, returning liquid condensate from the second zone to the first zone, releasing a vapor mixture comprising substantially anhydrous $HNO_3$ and $N_2O_4$ from the second zone, cooling said vapor mixture to effect condensation and separation of substantially anhydrous $HNO_3$, returning said anhydrous $HNO_3$ condensate to the second zone for intimate contact with vapors entering the second zone from the first zone and condensing and collecting the $N_2O_4$ vapors separated from the mixture of $HNO_3$ and $N_2O_4$ leaving the second zone.

6. A process for the manufacture of dinitrogen tetroxide which comprises continuously introducing nitric acid having a concentration in excess of 80% $HNO_3$ and elemental sulfur in a first reaction zone maintained at a temperature between 100° C. to a temperature below the melting point of sulfur, thereby producing as primary reaction products dinitrogen tetroxide and sulfuric acid together with nitrosyl sulfuric acid, its anhydride, lower oxides of nitrogen, and water as by-products, continuously releasing vapors from the first reaction zone comprising primarily $N_2O_4$, $HNO_3$, $H_2O$, and small amounts of nitrosyl sulfuric acid anhydride and lower oxides of nitrogen, continuously passing said vapors upwardly through a second reacting and separating zone countercurrent to and in intimate contact with cooler concentrated nitric acid to condense substantially all the vapor constituents having a boiling point above 86° C. and simultaneously converting at least a part of the lower oxides of nitrogen and nitrosyl sulfuric acid anhydride to dinitrogen tetroxide, continuously returning liquid condensate from the second zone to the first zone, continuously releasing a vapor mixture comprising substantially anhydrous $HNO_3$ and $N_2O_4$ from the second zone, continuously cooling said vapor mixture to effect condensation and separation of substantially anhydrous $HNO_3$, continuously returning said anhydrous $HNO_3$ condensate to the second zone for intimate contact with vapors entering the second zone from the first zone, condensing and collecting the $N_2O_4$ vapors separated from the mixture of $HNO_3$ and $N_2O_4$ leaving the second zone, and continuously discharging residual acid from the first zone.

References Cited in the file of this patent

UNITED STATES PATENTS

| | | |
|---|---|---|
| 1,590,043 | Lentz | June 22, 1926 |
| 1,912,832 | Fairlie | June 6, 1933 |
| 2,053,834 | Kacharoff et al. | Sept. 8, 1936 |
| 2,450,105 | Batchelder et al. | Sept. 28, 1948 |

FOREIGN PATENTS

| | | |
|---|---|---|
| 515,429 | Great Britain | Dec. 5, 1939 |

OTHER REFERENCES

Mellor: "Comprehensive Treatise on Inorganic and Theoretical Chemistry," vol. 8, page 585, Longmans. Green and Co., N. Y. C. 1928.